(12) United States Patent
Zaid et al.

(10) Patent No.: US 6,720,291 B2
(45) Date of Patent: Apr. 13, 2004

(54) WELL TREATMENT COMPOSITION FOR USE IN IRON-RICH ENVIRONMENTS

(75) Inventors: Gene H. Zaid, Sterling, KS (US); Beth Ann Wolf, Hutchinson, KS (US)

(73) Assignee: Jacam Chemicals, L.L.C., Sterling, KS (US)

( * ) Notice: Subject to any disclaimer, the term of this patent is extended or adjusted under 35 U.S.C. 154(b) by 40 days.

(21) Appl. No.: 09/935,808

(22) Filed: Aug. 23, 2001

(65) Prior Publication Data

US 2003/0041778 A1 Mar. 6, 2003

(51) Int. Cl.⁷ .............................. C09K 3/00; E21B 43/00
(52) U.S. Cl. ...................... 507/271; 507/276; 507/277; 507/235; 507/236; 507/237; 507/90; 507/927; 166/310; 166/312
(58) Field of Search ................................. 507/271, 277, 507/236, 235, 128, 141, 145, 276, 237, 90, 927; 166/310, 312

(56) References Cited

U.S. PATENT DOCUMENTS

| 3,127,932 | A | * | 4/1964 | Schremp | 166/310 |
| 3,182,018 | A | * | 5/1965 | Chittum | 507/271 |
| 5,344,818 | A | | 9/1994 | Zaid | |
| 5,396,958 | A | | 3/1995 | Zaid | |
| 6,177,025 | B1 | * | 1/2001 | Ring et al. | 252/69 |

OTHER PUBLICATIONS

Web page; http://www/dequest.com/ProdInfo/D2066A.htm; Jul. 23, 2001.
Web page; http://www/dequest.com/Function/Threshld.htm; Jul. 23, 2001.
Web page; http://www/dequest.com/Function/Sequest.htm; Jul. 23, 2001.

* cited by examiner

*Primary Examiner*—Philip Tucker
(74) *Attorney, Agent, or Firm*—Hovey Williams LLP

(57) ABSTRACT

Improved mud additive compositions are provided which are especially formulated to control hole enlargement due to salt bed erosion during drilling, and to assist in solubilization of deposited salt during well operations. The compositions include a first ingredient such as sodium or potassium ferrocyanide and mixtures thereof, and a second ingredient such as the a phosphonic acid, alkali or alkaline earth metal phosphonic acid salts, or mixtures thereof. The first ingredient is generally present at a level of from about 50–95% by weight in the particulate, dilutable form of the invention, whereas the second ingredient is present at a level of from about 5–50% by weight. The compositions hereof may be added to drilling mud during drilling operations or to fresh water for removing salt depositions.

69 Claims, No Drawings

WELL TREATMENT COMPOSITION FOR USE IN IRON-RICH ENVIRONMENTS

BACKGROUND OF THE INVENTION

1. Field of the Invention

The present invention is broadly concerned with improved mud additive compositions particularly formulated for the treatment of oil wells characterized by the presence of downhole iron, in order to minimize hole enlargement when salt beds are encountered during the drilling process, and to reduce the need for fresh water in the control of salt deposition within the well. More particularly, the invention pertains to an aqueous composition including a first ingredient such as sodium or potassium ferrocyanide and mixtures thereof and a second ingredient such as a phosphonic acid, an alkali or alkaline earth metal phosphonic acid salt, and mixtures thereof. The composition is added to recirculating drilling mud and lessens salt erosion even in the case of wells having high concentrations of iron therein. The composition may be added to circulation water to enhance solubilization of salt within the well.

2. Description of the Prior Art

During the course of oil well drilling operations, it sometimes occurs that a salt bed is encountered. When this happens, typical clay-based aqueous drilling mud can quickly erode the salt formation by dissolving salt, thereby creating a washed out annular zone. When this occurs, additional cement is needed to fill the hollowed out zone, thereby increasing drilling costs. The drill string may also become stuck as fluid velocity falls below cutting particle slip velocity in the widened zone, thereby causing particles to settle and bind the drill string. Furthermore, the hole enlargement greatly complicates formation evaluation efforts.

In response to these problems, it is conventional practice to add salt or saturated brine to the drilling mud through a hopper mixing system or fluid jetting system at the mud pit. In this way, annular erosion is lessened. However, this expedient is not entirely satisfactory, owing to the fact that downhole conditions of increasing temperature with depth enable brines that are salt-saturated at surface temperatures to dissolve additional salt in the well bore. As the resulting super-saturated brines are circulated to the surface and cooled, salt precipitates from the aqueous system. This precipitation can create a disposal problem in the pits and enables the brine to dissolve additional well bore salt during the next circulation.

Drilling mud additives have been commercialized in the past which serve to prevent dilution of the brine fraction of the recirculating drilling mud. Sodium ferrocyanide is a very effective and relatively inexpensive treating agent, and is therefore preferred. However, sodium ferrocyanide has a significant drawback in that if the well and its products contain iron, the effectiveness of the treatment is drastically reduced, and a blue, scale-like amorphous substance is deposited on downhole equipment. This leads to downtime and loss of production, and even a need to replace downhole equipment.

To overcome this problem a scale inhibiting agent has been used along with sodium ferrocyanide. These scale inhibiting agents are compounds such as the trisodium salt of nitrilotriacetic acid (NTA) and alkali metal citrates as described in U.S. Pat. No. 5,344,818. These scale inhibiting agents generally are capable of sequestering about 250–300 ppm of dissolved iron. This may seem adequate considering that a typical well characterized by the presence of downhole iron will contain a dissolved iron concentration of 50–100 ppm, however, as the age of an oil field increases incidences of iron-containing deposits, like rust, on pipe casings and other downhole equipment also tends to increase. During treatment, the scale inhibiting solution comes into contact with these pipe casings and pieces of equipment, thereby dissolving some of the built-up, iron-containing deposits. The dissolution of iron may become so great that by the time the scale inhibiting solution reaches the well bottom, the solution is already saturated with iron and unable to sequester the downhole iron.

There is accordingly a real and unsatisfied need in the art for an improved composition making use of an inexpensive ferrocyanide for brine control during drilling and well operations, while at the same time having the capacity to continue to sequester downhole iron even though being injected through aging well equipment containing built up iron deposits.

SUMMARY OF THE INVENTION

The present invention overcomes the problems outlined above, and provides a downhole well treating composition comprising (and preferably consisting of) a first ingredient selected from the group consisting of sodium and potassium ferrocyanide and mixtures thereof and a second ingredient selected from the group consisting of a phosphonic acid, alkali and alkaline earth metal phosphonic acid salts and mixtures thereof. Such a composition is supplied in an aqueous medium at the well site. At this point the liquid composition may be introduced into the well, typically by addition thereof to the recirculating drilling mud and/or to fresh water. It has been found that not only will this composition effectively control the salt erosion problem, but also maintains the capacity to sequester downhole iron and thereby eliminate the characteristic blue scale formation encountered in wells having significant downhole iron contents even though injected through aging well equipment containing built-up iron deposits.

Preferred particulate, dilutable downhole well treatment compositions in accordance with the invention include from about 20–95% by weight of a first ingredient selected from the group consisting of sodium and potassium ferrocyanide and mixtures thereof, with the sodium salt being the most commonly employed. The compositions also include from about 5–50% by weight of a second ingredient taken from the group consisting of a phosphonic acid, alkali and alkaline earth metal phosphonic acid salts and mixtures thereof, Dequest 2066A being preferred. All weight percentages are based on the weight of the entire composition being 100%. These levels are even more preferably from about 55–75% by weight for the first ingredient, and correspondingly from about 25–45% by weight for the second ingredient. The single most preferred levels of use are about 65% by weight for the first ingredient, and about 35% by weight for the second ingredient.

In actual practice, the particulate composition described above is dispersed in an aqueous medium. A preferred embodiment of the solution should contain between 1–12% by weight of sodium ferrocyanide and about 4–50% by weight of Dequest 2066A, more preferably about 25%. All weight percentages are based on the total weight of the solution being 100%. Soda ash is then added to the solution in sufficient amount to adjust the pH of the solution to about 7.

The aqueous medium may simply comprise plain water or brine, however different compounds may be added to enhance specific characteristics of the aqueous medium. For example, the aqueous medium may comprise an amount of a glycol, such as ethylene glycol in order to keep the solution from freezing if stored or used in cold environments. Those skilled in the art can readily discern the appropriate amount of ethylene glycol to include, depending upon the temperature extremes involved in the particular operation; preferably the solution will contain between 10–40% by weight ethylene glycol. Additionally, preferred embodiments of the invention contain from about 1–10% by weight sodium citrate and from about 1–10% by weight sodium erythorbate. All weight percentages are based on the total weight of the solution being 100%. The pH of the final product should be from about 6–14 with an optimum pH of about 8.5. The final product will be able to sequester at least about 10,000 ppm and up to about 50,000 ppm of iron without precipitation of iron compounds.

The aqueous treating compositions of the invention are introduced into an oil well in order to control the salt erosion problem, even in the case of wells having significant iron contents. While such introduction may be effected in a number of ways, generally speaking it is preferred to add the liquid compositions to the recirculating drilling mud. Typically, this is done by addition of the agents at the mud pit where jets can be used to stir the supplemented mud prior to recirculation downhole. The compositions should be added to the drilling mud at a level of from about 30–250 ppm, and more preferably at a level of from about 50–170 ppm of the drilling mud.

In addition, the compositions hereof may be added to fresh circulation water at the ppm levels indicted above, to serve as a medium for dissolving deposited salt on downhole well equipment. Use of the composition hereof reduces the amount of fresh water needed for this purpose.

The aqueous treating composition is not limited to use strictly in oil wells. The composition may be used to treat other systems, such as pipelines, which are characterized by the presence of iron-containing deposits.

DETAILED DESCRIPTION OF THE PREFERRED EMBODIMENTS

Sodium ferrocyanide is the most preferred brine-control agent for use in compositions of the invention. Sodium ferrocyanide is available from JACAM Chemicals, L.L.C. of Sterling, Kans., under the designation of "DeSalt" or "Salt Inhibitor".

It has been found that the addition of sodium or potassium ferrocyanide to brine increases the concentration of sodium chloride therein. When crystallization of the sodium chloride takes place, the resultant salt crystals become more pyramidal (dendritic salt) instead of cubical. This increased salt concentration in the brine renders it particularly useful in the context of oil well treatments.

The most preferred second ingredient is known by the trade name "Dequest 2066A" and is the trisodium salt of the following phosphonic acid:

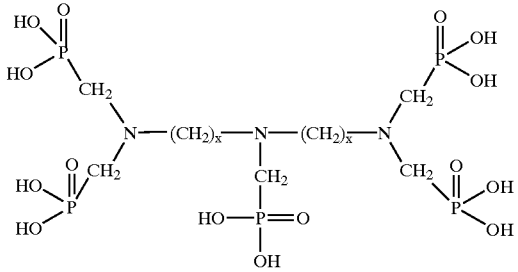

where x is equal to 2. Dequest 2066A is available from Solutia, Inc. of St. Louis, Mo. A product information sheet distributed by Solutia describing the Dequest 2066A product is incorporated herein. In addition to Dequest 2066A, the above phosphonic acid, alkali or alkaline earth metal salts or mixtures thereof where x has a value of from 2 to 6 may also be employed.

EXAMPLES

The following examples describe preferred compositions and methods in accordance with the invention. It is to be understood that these examples are illustrations only and nothing therein should be deemed as a limitation upon the overall scope of the invention.

The following examples set forth a series of experiments that was performed in order to test and compare the effectiveness of several different iron sequestering compounds when added to aqueous solutions containing sodium ferrocyanide. In these experiments, a 1:1 mixture of iron (II) and iron (III) chloride was employed as the iron source.

Example 1

An initial solution, without any scale inhibitor, was prepared by mixing 2.2% sodium citrate, 1.6% sodium erythorbate, 4.1% sodium ferrocyanide, 63.8% water and 28.3% ethylene glycol, all percentages are weight percentages based upon the total weight of the initial solution being 100%. A quantity of soda ash was added to the solution to adjust the pH to about 7. The quantity of soda ash added was 0.2% by weight of the total weight of the soda ash-containing solution.

Example 2

A sample was prepared to demonstrate the effects of introducing iron into the aqueous ferrocyanide solution with no iron sequestering compound present. In this experiment, 250 μg of iron chloride was added to 50 mL of the solution prepared in Example 1. An iron precipitate formed. The final solution had a pH of 9.63.

Example 3

In this example, 4.0% by weight amino tri-(methylene phosphonic acid) (ATMP, available as WSI 3300 from JACAM Chemicals L.L.C., Sterling, Kans.) was added to 50 mL of the solution prepared in Example 1. Next, 250 μg of iron chloride was added to the solution. An iron precipitate formed. The final solution had a pH of 6.71.

Example 4

In this example, 4.0% by weight neutralized ATMP (available as WSI 3310 from JACAM Chemicals) was added to 50 mL of the solution prepared in Example 1. The neutralized ATMP used in this example is similar to the ATMP used in Example 3, however the pH was adjusted to about 7 using sodium hydroxide. However, any one of the compounds selected from the group consisting of alkali metal salts, amines and alkyl amines such as tri-ethanol amine may be used in this pH adjustment step. Next, 250 μg of iron chloride was added to the solution. An iron precipitate formed. The solution had a final pH of 8.27.

In comparing Examples 3 and 4, it is apparent that the pH of the ATMP solution does not significantly alter the solution's ability to sequester iron.

Example 5

In this example, 4.0% by weight phosphate ester (available as WSI 3400 from JACAM Chemicals) was added to 25 mL of the solution prepared in Example 1. Next, 250 μg of iron chloride was added to the solution. An iron precipitate formed. The solution had a final pH of 7.03.

Example 6

In this example, 4.0% by weight of a low molecular weight acrylic acid/methyl acrylate co-polymer (available as WSI 3505 from JACAM Chemicals) was added to 25 mL of the solution prepared in Example 1. Next, 250 μg of iron chloride was added to the solution. An iron precipitate formed. The solution had a final pH of 9.35.

Example 7

In this example, 4.0% by weight of a mixture of a low molecular weight acrylic acid/methyl acrylate co-polymer and ATMP (said mixture available as WSI 3500 from JACAM Chemicals) was added to 25 mL of the solution prepared in Example 1. Next, 250 μg of iron chloride was added to the solution. An iron precipitate formed. The solution had a final pH of 8.90.

Example 8

In this example, a composition according to the present invention was prepared by adding 4.0% by weight Dequest 2066A (available from Solutia, Inc. of St. Louis, Mo.) to 25 mL of the solution prepared in Example 1. Next, 250 μg of iron chloride was added to the solution. No precipitate formed. Additional iron chloride was added so that the total amount of iron chloride added was 1000 μg, and still, no precipitate formed. The final solution had a pH of 8.81.

Example 9

Again, a composition according to the present invention was prepared by adding 25% by weight of Dequest 2066A to a sample of the solution prepared in Example 1. Iron chloride was added to the solution until a precipitate formed. It was determined that the solution as prepared in this example could sequester approximately 50,000 ppm of iron before precipitation of iron compounds occurred.

We claim:

1. A composition comprising:
   a first ingredient selected from the group consisting of sodium and potassium ferrocyanide and mixtures thereof; and
   a second ingredient selected from the group consisting of a phosphonic acid, alkali and alkaline earth metal salts of a phosphonic acid, and mixtures thereof,
   said composition being in the form of a powder dispersible in an aqueous medium to give a pH of from about 6–14.

2. The composition of claim 1, said first ingredient being present at a level of from about 50–95% by weight based on the total weight of the composition being 100%.

3. The composition of claim 1, said second ingredient being present at a level of from about 5–50% by weight based on the total weight of the composition being 100%.

4. The composition of claim 1, the composition consisting essentially of said first and second ingredients.

5. The composition of claim 1, said first ingredient being sodium ferrocyanide.

6. The composition of claim 1, said second ingredient being an alkali metal salt of said phosphonic acid.

7. The composition of claim 1, said second ingredient being a tri-sodium salt of said phosphonic acid.

8. The composition of claim 1, said phosphonic acid having the formula

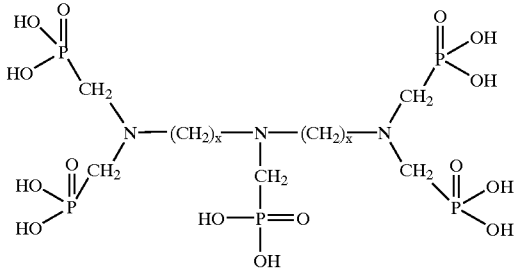

where x is from 2 to 6.

9. An aqueous composition comprising:
   a first ingredient selected from the group consisting of sodium and potassium ferrocyanide and mixtures thereof;
   a second ingredient selected from the group consisting of a phosphonic acid, alkali and alkaline earth metal salts of a phosphonic acid, and mixtures thereof; and
   from about 1–10% sodium citrate by weight based on the total weight of the solution being 100%,
   said first and second ingredients being dispersed in an aqueous medium.

10. The composition of claim 9, said composition having a pH of from about 6–14.

11. The composition of claim 9, said first ingredient being potassium ferrocyanide.

12. The composition of claim 9, said second ingredient being an alkali metal salt of said phosphonic acid.

13. The composition of claim 9, said second ingredient being a tri-sodium salt of said phosphonic acid.

14. The composition of claim 9, said first ingredient being present in said aqueous medium at a level of from about 1–12% by weight based on the total weight of the solution being 100%.

15. The composition of claim 9, said second ingredient being present in said aqueous medium at a level of from about 4–50% by weight based on the total weight of the solution being 100%.

16. The composition of claim 9, said aqueous medium consisting essentially of water.

17. The composition of claim 9, further comprising from about 1–10% sodium erythorbate by weight based on the total weight of the solution being 100%.

18. The composition of claim 9, further comprising from about 10–40% ethylene glycol by weight based on the total weight of the solution being 100%.

19. The composition of claim 9, said composition being capable of sequestering at least about 10,000 ppm of dissolved iron.

20. The composition of claim 9, said phosphonic acid having the formula

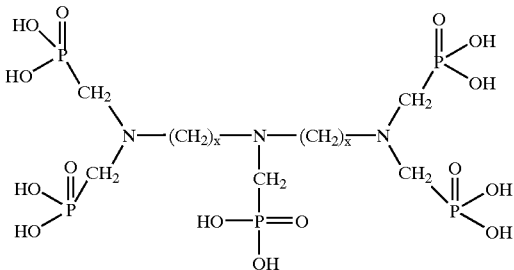

where x is from 2 to 6.

21. A composition comprising:

a first ingredient selected from the group consisting of sodium and potassium ferrocyanide and mixtures thereof; and a second ingredient selected from the group consisting of a phosphonic acid having the formula:

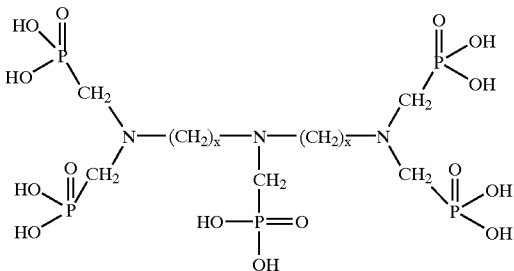

where x is from 2 to 6, alkali and alkaline earth metal salts of said phosphonic acid, and mixtures thereof, said composition being in the form of a powder dispersible in an aqueous medium to give a pH of from about 6–14.

22. The composition of claim 21, said first ingredient being present at a level of from about 50–95% by weight based on the total weight of the composition being 100%.

23. The composition of claim 21, said second ingredient being present at a level of from about 5–50% by weight based on the total weight of the composition being 100%.

24. The composition of claim 21, the composition consisting essentially of said first and second ingredients.

25. The composition of claim 21, said first ingredient being sodium ferrocyanide.

26. The composition of claim 21, said second ingredient being an alkali metal salt of said phosphonic acid wherein x is equal to 2.

27. The composition of claim 21, said second ingredient being a tri-sodium salt of said phosphonic acid wherein x is equal to 2.

28. An aqueous composition comprising:

a first ingredient selected from the group consisting of sodium and potassium ferrocyanide and mixtures thereof; and a second ingredient selected from the group consisting of a phosphonic acid having the formula

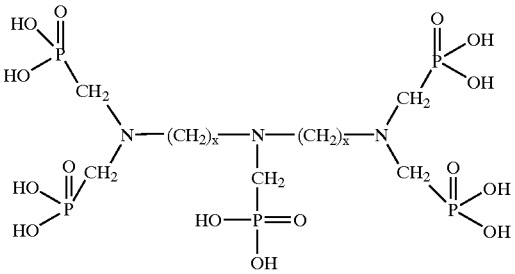

where x is from 2 to 6, alkali and alkaline earth metal salts of said phosphonic acid, and mixtures thereof; and from about 1–10% sodium citrate by weight based on the total weight of the solution being 100%, said first and second ingredients being dispersed in an aqueous medium.

29. The composition of claim 28, said composition having a pH of from about 6–14.

30. The composition of claim 28, said first ingredient being potassium ferrocyanide.

31. The composition of claim 28, said second ingredient being an alkali metal salt of said phosphonic acid wherein x is equal to 2.

32. The composition of claim 28, said second ingredient being a tri-sodium salt of said phosphonic acid wherein x is equal to 2.

33. The composition of claim 28, said first ingredient being present in said aqueous medium at a level of from about 1–12% by weight based on the total weight of the solution being 100%.

34. The composition of claim 28, said second ingredient being present in said aqueous medium at a level of from about 4–50% by weight based on the total weight of the solution being 100%.

35. The composition of claim 28, said aqueous medium consisting essentially of water.

36. The composition of claim 28, further comprising from about 1–10% sodium erythorbate by weight based on the total weight of the solution being 100%.

37. The composition of claim 28, further comprising from about 10–40% ethylene glycol by weight based on the total weight of the solution being 100%.

38. The composition of claim 28, said composition being capable of sequestering at least about 10,000 ppm of dissolved iron.

39. A method of treating a system characterized by the presence of iron deposits, said method comprising the steps of:

providing an aqueous treating composition comprising a first ingredient selected from the group consisting of sodium and potassium ferrocyanide and mixtures thereof, and a second ingredient selected from the group consisting of a phosphonic acid, alkali and alkaline earth metal salts of a phosphonic acid, and mixtures thereof, said first and second ingredients being dispersed in an aqueous medium; and introducing said aqueous composition into said system.

40. The method of claim 39, the composition consisting essentially of said first and second ingredients dispersed in said aqueous medium.

41. The method of claim 39, said composition having a pH of from about 6–14.

42. The method of claim 39, said first ingredient being potassium ferrocyanide.

43. The method of claim 39, said second ingredient being an alkali metal salt of said phosphonic acid.

44. The method of claim 39, said phosphonic acid having the formula

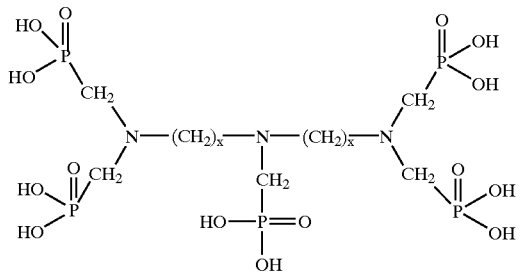

where x is from 2 to 6.

45. The method of claim 39, said first ingredient being present in said aqueous medium at a level of from about 1–12% by weight based on the total weight of the solution being 100%.

46. The method of claim 39, said second ingredient being present in said aqueous medium at a level of from about 4–50% by weight based on the total weight of the solution being 100%.

47. The method of claim 39, said aqueous medium consisting essentially of water.

48. The method of claim 39, wherein said system is an oil well characterized by the presence of downhole iron.

49. The method of claim 48, said composition is an aqueous downhole oil well treating composition, said composition being introduced into said oil well.

50. The method of claim 49, said composition being introduced into said well by addition of the composition to drilling mud derived from said well, with said composition-supplemented drilling mud being thereafter reintroduced into said well.

51. The method of claim 50, said composition being added to said drilling mud at a level of from about 30–250 ppm of said drilling mud.

52. The method of claim 48, said composition being added to water and introduced into said well.

53. A method of treating a system characterized by the presence of iron deposits, said method comprising the steps of:

providing an aqueous treating composition comprising a first ingredient selected from the group consisting of sodium and potassium ferrocyanide and mixtures thereof, and a second ingredient selected from the group consisting of a phosphonic acid having the formula

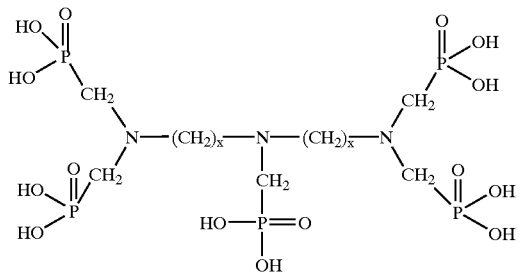

where x is from 2 to 6, alkali and alkaline earth metal salts of said phosphonic acid, and mixtures thereof,
said first and second ingredients being dispersed in an aqueous medium; and
introducing said aqueous composition into said system.

54. The method of claim 53, the composition consisting essentially of said first and second ingredients dispersed in said aqueous medium.

55. The method of claim 53, said composition having a pH of from about 6–14.

56. The method of claim 53, said first ingredient being potassium ferrocyanide.

57. The method of claim 53, said second ingredient being an alkali metal salt of said phosphonic acid wherein x is equal to 2.

58. The method of claim 53, said first ingredient being present in said aqueous medium at a level of from about 1–12% by weight based on the total weight of the solution being 100%.

59. The method of claim 53, said second ingredient being present in said aqueous medium at a level of from about 4–50% by weight based on the total weight of the solution being 100%.

60. The method of claim 53, said aqueous medium consisting essentially of water.

61. The method of claim 53, wherein said system is an oil well characterized by the presence of downhole iron.

62. The method of claim 61, said composition is an aqueous downhole oil well treating composition, said composition being introduced into said oil well.

63. The method of claim 62, said composition being introduced into said well by addition of the composition to drilling mud derived from said well, with said composition-supplemented drilling mud being thereafter reintroduced into said well.

64. The method of claim 63, said composition being added to said drilling mud at a level of from about 30–250 ppm of said drilling mud.

65. The method of claim 61, said composition being added to water and introduced into said well.

66. An aqueous composition comprising:

a first ingredient selected from the group consisting of sodium and potassium ferrocyanide and mixtures thereof;

a second ingredient selected from the group consisting of a phosphonic acid, alkali and alkaline earth metal salts of a phosphonic acid, and mixtures thereof; and from about 1–10% sodium erythorbate by weight based on the total weight of the solution being 100% said first and second ingredients being dispersed in an aqueous medium.

67. An aqueous composition comprising:

a first ingredient selected from the group consisting of sodium and potassium ferrocyanide and mixtures thereof;

a second ingredient selected from the group consisting of a phosphonic acid, alkali and alkaline earth metal salts of a phosphonic acid, and mixtures thereof; and from about 10–40% ethylene glycol by weight based on the total weight of the solution being 100%, said first and second ingredients being dispersed in an aqueous medium.

68. An aqueous composition comprising:

a first ingredient selected from the group consisting of sodium and potassium ferrocyanide and mixtures thereof; and a second ingredient selected from the group consisting of a phosphonic acid having the formula

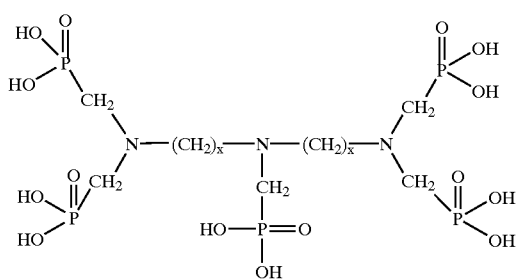

where x is from 2 to 6, alkali and alkaline earth metal salts of said phosphonic acid, and mixtures thereof; and from about 1–10% sodium erythorbate by weight based on the total weight of the solution being 100%, said first and second ingredients being dispersed in an aqueous medium.

69. An aqueous composition comprising:

a first ingredient selected from the group consisting of sodium and potassium ferrocyanide and mixtures thereof; and a second ingredient selected from the group consisting of a phosphonic acid having the formula

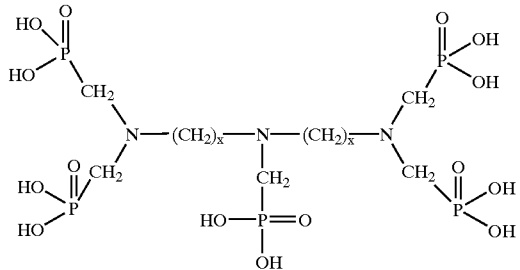

where x is from 2 to 6, alkali and alkaline earth metal salts of said phosphonic acid, and mixtures thereof; and from about 10–40% ethylene glycol by weight based on the total weight of the solution being 100%, said first and second ingredients being dispersed in an aqueous medium.

* * * * *